(12) United States Patent
Bowers

(10) Patent No.: US 7,001,583 B2
(45) Date of Patent: *Feb. 21, 2006

(54) ESSENTIALLY INSOLUBLE HEAVY METAL SULFIDE SLURRY FOR WASTEWATER TREATMENT

(75) Inventor: Gregory S. Bowers, Greenville, SC (US)

(73) Assignee: Southern Water Treatment, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/105,890

(22) Filed: Apr. 14, 2005

(65) Prior Publication Data

US 2005/0173350 A1 Aug. 11, 2005

Related U.S. Application Data

(62) Division of application No. 10/122,775, filed on Apr. 15, 2002, now Pat. No. 6,896,817.

(51) Int. Cl.
  *C01G 45/00* (2006.01)
  *C01G 49/12* (2006.01)
(52) U.S. Cl. ................ 423/561.1; 423/566.1
(58) Field of Classification Search ............. 423/561.1, 423/566.1
See application file for complete search history.

(56) References Cited

U.S. PATENT DOCUMENTS 4,250,030 A * 2/1981 Kuit et al. .................. 210/684
6,896,817 B1 * 5/2005 Bowers ...................... 210/716

* cited by examiner

*Primary Examiner*—Wayne A. Langel
(74) *Attorney, Agent, or Firm*—Leigh P Gregory

(57) ABSTRACT

A product and method for the removal of pollutant heavy metals from aqueous solutions which precludes the end user from storing, handling, feeding and controlling hazardous soluble sulfide materials. The product is a slurry which includes a mixture of a liquid medium and an essentially insoluble salt wherein the salt is the reaction product of heavy metal ions, preferably selected from $Mn^{++}$ ions, $Fe^{++}$ ions, and $Fe^{+++}$ ions, and sulfide ions derived from soluble sulfide sources such as sodium sulfide, hydrogen sulfide, and sodium hydrosulfide. Addition of the subject slurry to a wastewater stream will effect the precipitation of heavy metals with lesser equilibrium sulfide ion concentrations than that of the essentially insoluble salt. Solids collected by this method may be returned to subsequent wastewater streams for additional removal of heavy metals by any excess heavy metal sulfide salt.

17 Claims, No Drawings

ESSENTIALLY INSOLUBLE HEAVY METAL SULFIDE SLURRY FOR WASTEWATER TREATMENT

This is a divisional application of U.S. Ser. No. 10/122,775, filed Apr. 15, 2002, U.S. Pat. No. 6,896,817.

FIELD OF THE INVENTION

The present invention is directed to a product and a process for producing a "pre-made" heavy metal sulfide slurry, which can be used for the removal of heavy metal pollutants from and the reduction of hexavalent chromium in wastewater.

BACKGROUND OF THE INVENTION

Various chemical precipitation methods have been employed as one aspect of a complete system for the removal of heavy metal pollutants from aqueous solutions. Sulfide precipitation is often employed because sulfide salts may be used to remove heavy metal pollutants such as lead, copper, silver, cadmium, zinc, mercury, and nickel. Sulfides are also used as a reducing agent to convert hexavalent chromium to trivalent chromium. There are two basic types of sulfide precipitation processes—the soluble sulfide process and the insoluble sulfide process.

By the soluble sulfide process, a soluble sulfide salt such as sodium sulfide or sodium hydrosulfide is added to a wastewater stream containing at least one heavy metal pollutant. The soluble salt quickly dissociates into sodium ions and sulfide ions and the heavy metal pollutant ions rapidly react with the sulfide ions to form a relatively insoluble heavy metal salt, which precipitates out of solution. There are two common problems associated with the soluble sulfide process. First, the relatively insoluble heavy metal pollutant sulfide salt often forms as very fine colloidal particles, which are not easily filtered or otherwise separated from the wastewater stream. Of even greater concern is the formation of odorous and highly toxic hydrogen sulfide gas, which invariably results from the high concentration of soluble sulfides present in the soluble sulfide process. Thus, the soluble sulfide process must be carefully monitored and controlled in order to avoid discomfort and harm to the treatment personnel.

Sulfur dioxide and sodium metabisulfite are used for chromium reduction, and again, close pH control is necessary to balance the efficiency of use, and the evolution of corrosive and toxic sulfur dioxide gas.

Ferrous sulfate and ferrous chloride are used alone and in conjunction with sodium metabisulfite. The same concerns are present with sulfur dioxide gas evolution, and the iron salts generate unacceptable amounts of sludge, which is considered a hazardous waste.

U.S. Pat. No. 3,740,331 represents an early attempt to exploit the benefits of the soluble sulfide process while avoiding the formation of hydrogen sulfide gas. A soluble heavy metal salt was added either immediately after or immediately before the addition of the soluble sulfide salt to the wastewater stream. The heavy metal of the soluble heavy metal salt was chosen based on its relative equilibrium sulfide ion concentration as compared to that of the given pollutant heavy metal. That is, the slightly less insoluble heavy metal ion of the soluble heavy metal salt was added to the wastewater stream during the soluble sulfide process to act as a scavenger for excess sulfide thereby avoiding the formation of $H_2S$.

The insoluble sulfide process is a variation on the chemistry disclosed in the '331 patent. By the insoluble sulfide process, a freshly prepared slurry of an essentially insoluble heavy metal sulfide salt is added to a wastewater stream. Hereagain, the heavy metal of the essentially insoluble heavy metal sulfide salt is chosen based on its relative equilibrium sulfide ion concentration as compared to that of the given pollutant heavy metal. Specifically, the essentially insoluble heavy metal sulfide salt must be slightly less insoluble than the heavy metal pollutant salt, which will eventually be formed. Thus, as the essentially insoluble heavy metal sulfide salt dissociates in solution, the heavy metal pollutant salt is formed. The essentially insoluble heavy metal sulfide salt can only further dissociate as the sulfide ions are consumed in the formation of the heavy metal pollutant salt. Therefore, there is never an excess of sulfide ions such that $H_2S$ formation is avoided.

U.S. Pat. No. 4,102,784 discloses an insoluble sulfide process, which is concerned with avoiding the formation of very fine, colloidal particles of the resultant heavy metal pollutant salt. By the process set forth in the '784 patent approximately 90% of the insoluble sulfide particles must have a diameter of at least 50 microns or more. The '784 patent also requires that the insoluble sulfide slurry is maintained at a pH of greater than 7 in order to avoid $H_2S$ formation. Further, although the slurry disclosed in the '784 patent is formed in the absence of pollutant heavy metal ions to avoid the production of colloidal particles such as that patent asserts are formed in accordance with the method of the '331 patent, discussed above, the slurry of the '784 patent is, nevertheless, formed on site at the wastewater treatment facility and must be constantly, carefully agitated and temperature controlled prior to addition to the wastewater stream. Because the slurry is formed on-site, it must be maintained and fed to the wastewater stream at a pH of greater than 7 in order to reduce the formation of hydrogen sulfide gas which will form in the presence of any excess sulfide ions.

U.S. Pat. No. 4,422,943 discloses an insoluble sulfide process, which employs iron pyrite, $FeS_2$, rather than a ferrous or ferric sulfide slurry. That process requires that the slurry is made on-site at the wastewater treatment facility and is added to the wastewater stream at a pH above 7 in order to avoid the formation of $H_2S$ gas, which will form in the presence of any excess sulfide ions.

SUMMARY OF THE INVENTION

Accordingly, the present invention is directed to a heavy metal sulfide slurry for use in a wastewater treatment process, which includes a mixture of a liquid medium, preferably water, and an essentially insoluble salt, which is the reaction product of heavy metal ions and sulfide ions. Preferred heavy metal ions include $Mn^{++}$ ions, $Fe^{++}$ ions, and $Fe^{+++}$ ions. Preferably the sulfide ions are derived from hydrogen sulfide, sodium sulfide, sodium hydrosulfide, potassium sulfide, potassium hydrosulfide, calcium sulfide, or magnesium sulfide. In one preferred embodiment the essentially insoluble salt is ferrous sulfide. An important aspect of the invention is the small particle size of the essentially insoluble salt within the slurry. Preferably the salt has a particle size distribution wherein at least about 50 percent of the particles have a size of less than about 10 microns; most preferably at least about 75 percent of the particles have a size of less than about 10 microns. It is also preferred that at least about 50 percent of the particles have a size of less than about 1 micron. The salt comprises greater than 2 percent by weight of the slurry.

In another aspect the present invention is directed to a heavy metal sulfide slurry for use in a wastewater treatment process which is made by a method which includes the steps of: (a) precipitating an essentially insoluble heavy metal sulfide salt from a solution comprising a soluble heavy metal salt and a soluble sulfide; (b) separating the salt from the solution, thereby forming a slurry having greater than 2% by weight of the salt. Step (b) may be achieved by essentially completely separating the salt from the solution and then dispersing the salt into a liquid medium such that a slurry having greater than 2% by weight of the salt is formed or by concentrating the solution, that is, removing excess solution such that a slurry having greater than 2% by weight of the salt is formed. If the former means is employed preferably the salt is washed subsequent to separation from the solution, thereby removing residual soluble salts. The step (a) of precipitating an essentially insoluble heavy metal sulfide salt may be performed in one of at least two ways. In one embodiment step (a) is achieved by the substeps of (i) preparing an initial solution of a soluble heavy metal salt; (ii) raising the pH and thereby forming a heavy metal hydroxide; and (iii) adding a soluble sulfide, thereby forming an essentially insoluble heavy metal sulfide salt which is the reaction product of the heavy metal hydroxide and the soluble sulfide. In an alternative embodiment step (a) is achieved by the substeps of (i) preparing an initial solution of a soluble sulfide; and (ii) adding a soluble heavy metal salt, thereby forming an essentially insoluble heavy metal sulfide salt which is the reaction product of the soluble heavy metal salt and the soluble sulfide.

Additionally, the present invention is directed to a method for treating wastewater which includes the steps of: (a) providing an essentially insoluble heavy metal sulfide slurry which is a mixture of a liquid medium, preferably water, and an essentially insoluble salt which is the reaction product of heavy metal ions, preferably $Mn^{++}$ ions, $Fe^{++}$ ions, or $Fe^{+++}$ ions, and a soluble sulfide, the insoluble salt having a particle size distribution wherein at least about 50 percent of the particles have a size of less than 10 microns and the salt is greater than 2 percent by weight of the slurry; and (b) adding the slurry to a wastewater stream containing at least one heavy metal pollutant. Exemplary pollutants, which may be removed by the present process, are heavy metals such as $Zn^{++}$, $Ni^{++}$, $Sn^{++}$, $Co^{++}$, $Pb^{++}$, $Cd^{++}$, $Ag^+$, $Bi^{++}$, $Cu^{++}$, and $Hg^{++}$. Further, hexavalent chromium may be reduced to trivalent chromium by the present process. The slurry may be added to the wastewater stream at a pH in the range of from about 2.5 to about 11. Solids formed by the addition of the slurry to the wastewater stream may be collected and monitored for color. The collected solids, which are essentially black in color, may be returned to the process and added to a subsequent wastewater stream in order to advantageously employ any unreacted heavy metal sulfide salt.

DETAILED DESCRIPTION OF THE PREFERRED EMBODIMENTS

The present invention is directed to a heavy metal sulfide slurry for use in a wastewater treatment process, which includes a mixture of a liquid medium, preferably water, and an essentially insoluble salt, which is the reaction product of heavy metal ions and sulfide ions. While ferrous ions ($Fe^{++}$) are preferred, manganese ions ($Mn^{++}$ ions) and ferric ions ($Fe^{+++}$ ions) may also be employed as the heavy metal component of the essentially insoluble heavy metal sulfide salt of the present inventive slurry. Preferably, the salt comprises greater than 2 percent by weight of the slurry, the balance comprising water and, optionally, one or more additives, discussed below.

Of particular importance to the present invention is the particle size distribution of the essentially insoluble heavy metal salt. At least 50 percent of the particles are less than 10 microns in diameter. Preferably, at least 75 percent of the particles are less than 10 microns in diameter; and most preferably, all of the particles are less than 10 microns in diameters. Furthermore, it is preferred that at least 50 percent of the particles are less than 1 micron in diameter. More preferably, at least 75 percent of the particles are less than 1 micron in diameter. It is also within the scope of the present invention for all of the particles to be less than 1 micron in diameter.

Small particle size is of particular importance to the present invention for a variety of reasons. First, smaller particle size means greater surface area of the salt is exposed to the wastewater stream for rapid and efficient reaction with the pollutant heavy metal ions. While not wishing to be bound by theory, it is believed that the exceedingly small particle size contributes to the efficient reaction of dissociated sulfide ions with heavy metal pollutant ions and the reduced dissociation of excess sulfide ions.

Second, it is believed that small particle size allows for the preparation of a manageable slurry having a greater percent by weight of the salt than could be achieved if the salt had a larger particle size. That is, although it may be possible to form a slurry having greater than 2 percent by weight of a salt having a particle size greater than that of the present inventive salt, such slurry would not exhibit the ease of handling, specifically pumpability and injectability, of the present slurry.

Third, and perhaps most important, it is believed that it is the small particle size is one reason the present slurry may be prepared ahead of time, at a site remote from the final wastewater treatment site. A slurry containing larger particles must be constantly agitated in order to keep the large particles in suspension. Thus, all prior art insoluble sulfide processes have required preparation on-site at the wastewater treatment facility immediately prior to addition to wastewater stream. In addition to precluding centralized, remote preparation of the insoluble sulfide slurry, the requirement that prior art slurries are constantly agitated also increases the likelihood of air entrapment. Heavy metal sulfide salts are especially vulnerable to oxidation and any exposure to air will reduce the effectiveness of the slurry. Thus, the present inventive slurry is preferably maintained in closed containers during preparation, storage and shipment. This, in combination with the ability of the small particles to remain suspended in the slurry without stirring or agitation, limits the exposure of much of the volume of the slurry to oxygen such that the possibility of oxidation is reduced. However, it has been found, unexpectedly, in accordance with the present invention that, even given equal opportunities for oxygen exposure, dilute slurries are more greatly effected by oxidation than the present concentrated slurry, possibly because exposure of the slurry surface to the air will only oxidize a small percentage of the more concentrated slurry. Oxidation of particles in a more dilute slurry will have a greater adverse effect.

Thus, all prior insoluble sulfide processes have required that the personnel performing the wastewater treatment process must freshly prepare an insoluble sulfide slurry, including monitoring temperature, pH, and agitation, on-site and then feed the slurry to the wastewater stream at a tightly controlled pH in order to avoid the formation of noxious $H_2S$ gas. That is, the pH must be carefully controlled and maintained above 7 because of the possibility that excess sulfide salts may have been employed in preparing the slurry and, therefore, excess sulfide ions may be present. The present heavy metal sulfide salt slurry can be prepared at a centralized facility, stored, if necessary, and then shipped to wastewater treatment facilities for turnkey use in their treatment processes.

In addition to the essentially insoluble heavy metal sulfide salt and the liquid medium, which is preferably water, the present inventive slurry may also include one or more additives. Such additives may include components that merely enhance the physical characteristics or the performance of the slurry. Exemplary of this class of additive are thickeners, dispersants, flow enhancers, surfactants, perfumes, and fillers. For example, a polyacrylic acid-based dispersant is preferably employed in order to evenly disperse the salt in the liquid medium. Other types of additives may include components that are, themselves, employed in wastewater treatment and which may provide a complementary treatment to or enhancement of the insoluble sulfide process. Such may include, for example, sodium dimethyldithiocarbamate, calcium dimethyldithiocarbamate, calcium sulfide, calcium polysulfide, sodium borohydride, sodium sulfite, potassium sulfite, sodium sulfide, sodium hydrosulfide, sodium metabisulfite, potassium sulfide, potassium hydrosulfide, potassium metabisulfite, additional iron salts such as ferric chloride, ferrous chloride, ferrous sulfate, ferric sulfate, ferric hydroxide, ferrous hydroxide, short chain low molecular weight high charge density polymers, quaternary amine polymers, polyquatenary amine polymers, melamine formaldehyde polymers, aluminum hydroxide, sodium aluminate, sodium hydroxide, caustic potash, calcium hydroxide, magnesium hydroxide, magnesium chloride, manganese chloride, manganese dioxide, calcium chloride, aluminum chlorhydrate, sodium silicate, aluminum chloride, polyaluminum chloride, sodium polyacrylate polymers (anionic, cationic and nonionic), antifoam agents, dispersants, and methylcellulose-based materials. It should be noted that even though, as is discussed in greater detail below, it is a benefit of the present inventive slurry that it may be added to a wastewater stream at an acidic pH because of the absence of excess sulfide ions, the present list of possible additives includes a variety of soluble sulfide salts which will effectively add excess sulfide ions. This is because, in accordance with the present invention, for wastewater streams having an unusually high concentration of heavy metal pollutant ions the present insoluble sulfide process may be advantageously and safely combined with the prior art soluble sulfide process. That is, the present slurry including one or more soluble sulfide salts may be added to such a heavily concentrated wastewater stream, even at an acid pH, and the sulfide ions will be immediately, essentially consumed by the pollutant ions prior to the formation of any appreciable amount of hydrogen sulfide gas. When all of the sulfide ions from the soluble sulfide salt have been consumed, the present essentially insoluble heavy metal sulfide salt will dissociate in accordance with its equilibrium sulfide ion concentration and the remaining heavy metal pollutant ions will be precipitated without the formation of $H_2S$.

As discussed above, the preferred heavy metal sulfide salt of the present inventive slurry is ferrous sulfide, FeS. Less preferred, but also within the scope of the present invention are manganese sulfide, MnS, and ferric sulfide, $Fe_2S_3$. As has been noted in the prior art, any heavy metal sulfide may be employed to remove from a wastewater stream any heavy metal pollutant ion, which has a lower equilibrium sulfide ion concentration. Thus, in theory, a variety of heavy metals may be used, but in order to effectively remove the greatest number of differing pollutants, ferrous sulfide is most preferred.

The present heavy metal sulfide slurry is preferably made by a process which includes the steps of: (a) precipitating an essentially insoluble heavy metal sulfide salt from a solution comprising a soluble heavy metal salt and a soluble sulfide; and (b) separating the insoluble heavy metal sulfide salt from the solution in order to form a slurry comprising greater than 2% by weight of the slurry. Step (b) may be achieved by essentially completely separating the salt from the solution, such as by filtering, and then dispersing the salt into a liquid medium such that a slurry having greater than 2% by weight of the salt is formed or by concentrating the solution, that is, removing excess solution such that a slurry having greater than 2% by weight of the salt is formed. If the former means is employed preferably the salt is washed subsequent to separation from the solution, thereby removing residual soluble salts.

If the essentially insoluble heavy metal sulfide salt is ferrous sulfide, then a preferred soluble heavy metal salt for use in this process is ferrous chloride, although a variety of other soluble ferrous salts may be employed. Preferably, the sulfide ions are derived from hydrogen sulfide, sodium sulfide, sodium hydrosulfide, potassium sulfide, potassium hydrosulfide, calcium sulfide, or magnesium sulfide.

In accordance with the present invention, step (a) may be performed in one of two ways. Preferably, step (a) is achieved by preparing an initial solution of a soluble heavy metal salt, raising the pH, through the addition of, preferably, sodium hydroxide and thereby forming a heavy metal hydroxide, and adding a soluble sulfide, thereby forming an essentially insoluble heavy metal sulfide salt which is the reaction product of the heavy metal hydroxide and the soluble sulfide. In an alternative embodiment step (a) is achieved by preparing an initial solution of a soluble sulfide and adding a soluble heavy metal salt, thereby forming an essentially insoluble heavy metal sulfide salt which is the reaction product of the soluble heavy metal salt and the soluble sulfide. After the essentially insoluble heavy metal salt is formed, it is preferably separated from the original solution and washed to remove any residual soluble salts. Then, in order to avoid prolonged exposure to air, the insoluble heavy metal salt is dispersed in a liquid medium. Although water is preferred, other liquids such as organic or polymeric solvents may be employed. Further, as noted above, it is also within the scope of the present invention to concentrate the original solution in which the salt was formed rather than separating the salt from that solution and then dispersing it in a second liquid medium.

In another aspect the present invention is directed to a method for treating wastewater, which includes, at least, the step of adding the present inventive slurry to a wastewater stream, which includes at least one heavy metal pollutant. Exemplary pollutants, which may be removed by the present process, are heavy metals such as $Zn^{++}$, $Ni^{++}$, $Sn^{++}$, $Co^{++}$, $Pb^{++}$, $Cd^{++}$, $Ag^+$, $Bi^{++}$, $Cu^{++}$, and $Hg^{++}$, although other heavy metal pollutants, which have an equilibrium sulfide ion concentration less than that of the present essentially insoluble heavy metal salt, also may be removed by the present inventive wastewater treatment process. Further, hexavalent chromium may be reduced to trivalent chromium by the present process.

A unique feature of the present process is that the inventive slurry may be added to the wastewater stream at a pH in the broad range of from about 2.5 to about 11. All other known insoluble sulfide processes require addition of the insoluble sulfide slurry to the treatment stream at a pH of greater than 7 in order to avoid the formation of $H_2S$ gas. The present slurry essentially precludes the formation of hydrogen sulfide gas even at an acidic pH.

As another aspect of the present invention precipitated heavy metal pollutant sulfide salts formed upon treatment by the present process may be monitored for color. Generally, such salts will be brown or reddish in color. A black color indicates that excess, unreacted ferrous sulfide is present in the precipitant. Such solids may be returned to subsequent wastewater streams in order to advantageously employ any unreacted heavy metal sulfide salt.

EXAMPLES

Example 1

An essentially insoluble ferrous sulfide salt in accordance with the present invention was prepared as follows. Two parts of a stock solution of commercial ferrous chloride, $FeCl_2$ (approximately 26% $FeCl_2$) was diluted with one part water. Caustic (sodium hydroxide) was then added in excess to precipitate all of the iron as ferrous hydroxide. Sodium hydrosulfide was then added to convert the ferrous hydroxide to ferrous sulfide. Additional water was added to dilute the soluble salts. The ferrous sulfide was then separated from the solution containing soluble salts by means of a filter press. The ferrous sulfide was then dispersed in water to form a slurry having 6.8% percent by weight ferrous sulfide. At least 75 percent of the ferrous sulfide particles were less than 1 micron in diameter. Two percent by weight of a polyacrylic acid-based dispersant was then added.

Example 2

An essentially insoluble ferrous sulfide salt in accordance with the present invention was prepared essentially as set forth in Example 1. However, following separation by means of a filter press from the original solution, the ferrous sulfide was then dispersed in water to form a slurry having 20% by weight ferrous sulfide. At least 75 percent of the iron sulfide particles were less than 1 micron in diameter. Two percent by weight of a polyacrylic acid-based dispersant was then added.

Example 3

An essentially insoluble ferric sulfide salt in accordance with the present invention was prepared as follows. A stock solution of commercial ferric chloride, FeCl3 (approximately 30% FeCl3) was diluted 2:1 with water. Caustic was then added in excess to precipitate all of the iron as ferric hydroxide. Sodium hydrosulfide was then added to convert the ferric hydroxide to ferric sulfide. Additional water was added to dilute the soluble salts. The ferric sulfide was then separated from the solution by means of a filter press. The ferric sulfide was then dispersed in water to form a slurry having 6.8% percent by weight ferric sulfide. Two percent by weight of a polyacrylic acid-based dispersant was then added.

Example 4

An essentially insoluble ferrous sulfide salt in accordance with the present invention was prepared as follows. A concentrated solution of sodium hydrosulfide was diluted 10:1 with water. Commercially available ferrous chloride solution diluted 10:1 was added to precipitate the iron as ferrous sulfide. Caustic was added to maintain the pH of the mixture at or around 11. Additional water was added to dilute the soluble salts. The ferrous sulfide was separated from the solution by means of a Buchner funnel and then washed with water to remove any residual soluble salts. The ferrous sulfide was then dispersed in water to form a slurry having about 6.5% percent by weight ferrous sulfide. At least 75 percent of the ferrous sulfide particles were less than 1 micron in diameter. Two percent by weight of a polyacrylic acid-based dispersant was then added.

Example 5

The essentially insoluble ferric sulfide salt of Example 3 was used to remove metal ions from a wastewater stream as follows. The wastewater stream contained 31 mg/l of hexavalent chrome, 13.9 mg/l of nickel, and 18.7 mg/l of copper. A 1000 ml sample was taken and approximately 2.04 grams of material were added to the jar. The solution was mixed. The pH was adjusted to 2.08 with 10% sulfuric acid. The contents of the jar were allowed to mix for two hours. The amount of hexavalent chrome at that time was found to be 6.9 ppm. The pH of the solution was raised to 9.0 with 10% sodium hydroxide. The analysis of a filtered sample showed the total chrome to be less than 10 ppm. Copper was non-detectable and nickel was 0.48 ppm. No odor was detected at any time during the experiment. Additional material would be required to reduce the hexavalent chrome to lower levels.

Example 6

The essentially insoluble ferrous sulfide salt of Example 2 was used to remove metal ions from a wastewater stream essentially as set forth in Example 5. Once again, following treatment with the present inventive ferrous sulfide slurry and addition of an anionic flocculent, analysis of the clear supernate by ICP showed non-detect levels of chrome, nickel and copper. As above, this example simulates a typical chrome plater and shows how the present inventive heavy metal sulfide slurry performs. There was no odor detected at any time during the reaction.

Comparative Example 7

A magnesium hydroxide-sodium sulfide blend was used to remove metal ions from a wastewater stream as follows. The wastewater stream contained 31 mg/l of hexavalent chrome, 13.9 mg/l of nickel, and 18.7 mg/l of copper. A 1000 ml sample was taken. The pH was adjusted to a pH of 7 in order to prevent gassing of sulfide. Approximately 1.055 grams of the magnesium hydroxide—sodium sulfide blend was added to the jar. The solution was mixed and allowed to settle. Analysis of the clear supernate showed 0.02 mg/l of hexavalent chrome. Most of the hexavalent chrome had been converted to trivalent chrome. In order to get clarity of the solution a coagulant was added at a dosage of 0.1 ml/l. The pH of the solution was raised with sodium hydroxide to a pH of 9. Again the solution was mixed. Then 3.7 mg/l of anionic flocculant was added. The solution was then allowed to settle. Analysis of the wastewater by ICP showed the chrome, nickel and copper levels to be non-detect. This example shows a prior art process wherein a blend of sulfide and magnesium hydroxide was used to remove the heavy metals. There was significant odor associated with this set of experiments because of the soluble sulfide being used.

Example 8

The essentially insoluble ferrous sulfide salt of Example 2 was used to remove metal ions from a wastewater stream as follows. The wastewater stream contained 83 mg/l of hexavalent chrome. A 1000 ml sample was taken and approximately 3.0030 grams of material was added to the jar. The solution was mixed for 10 minutes. Analysis of a filtered solution showed no hexavalent chrome remaining. The pH of the solution was raised using sodium hydroxide to a pH of 9. The solution mixed and then 5 mg/l of anionic flocculant was added. The solution was allowed to settle. Analysis of the clear supernate by ICP showed the levels of chrome to be non-detect. No odor was detected during the experiment.

Comparative Example 9

A commercially available solution of 30% by weight of sodium metabisulfite was used to remove metal ions from a wastewater stream as follows. The wastewater stream contained 83 mg/l of hexavalent chrome. A 1000 ml sample was taken and the 30% sodium metabisulfite solution was fed under pH and ORP control. Approximately 2 ml of the sodium metabisulfite solution was added. The solution was checked for hexavalent chrome and the result was non-detect. All of the hexavalent chrome had been converted to trivalent. A coagulant was added to improve clarity. The dosage rate was 0.150 ml/l. The pH of the solution was raised to 9 by the addition of sodium hydroxide. Then 4.0 mg/l of an anionic flocculant was added. The solution was allowed to settle. Analysis of the wastewater by ICP showed chrome levels to be non-detect. However, sulfur dioxide fumes were present during the entire experiment. Most users of $SO_2$ and sodium metabisulfite must use a fume scrubber to avoid this problem.

Example 10

The precipitated solids from Example 6 were allowed to settle and were collected on a filter paper. The solids still contained black, unreacted insoluble iron sulfide. Theses solids were then added to another 1000 ml sample of the same wastewater employed in Example 6. The same procedure was then followed except no additional insoluble sulfide was added. Initial analysis of the chrome showed 83 ppm. Analysis of a sample of clear supernate showed the hexavalent chrome level was reduced 66 ppm. This example demonstrates how settled solids containing unused insoluble sulfide are available for reuse and can be recycled and used in subsequent waste streams. This can be visually determined by the color of the solids present: Black solids indicate that there is still chemical activity available in the solids while increasing shades of brown ending in light brown show that the insoluble sulfide has been used.

Example 11

An aluminum extruder was using sodium metabisulfite to reduce hexavalent chrome. The extruder was having difficulty meeting the desired discharge limits while processing the necessary amount of wastewater. The extruder changed to a soluble sulfide precipitant containing sodium sulfide and was able to process more water, meet their discharge limit, and generate less sludge. The personnel involved liked the performance of the sulfide material but did not like the smell associated with its use. An insoluble ferrous sulfide slurry made in accordance with Example 1 was introduced at the facility, replacing the soluble sulfide product. The extruder was able to meet their discharge requirements and process the required amount of wastewater, with the added benefit of not generating any odor.

Example 12

A manganese sulfide material was made by adding hydrochloric acid to manganese dioxide and then neutralizing this solution with sodium hydroxide. Sodium hydrosulfide solution was added to excess to convert the manganese hydroxide to manganese sulfide. The manganese sulfide slurry was diluted with water and filtered. The manganese sulfide solids were collected and re-slurried with water, creating a mixture that was about 10% by weight manganese sulfide.

Example 13

The essentially insoluble manganese sulfide salt slurry of Example 12 was used to remove metal ions from a wastewater stream as follows. The wastewater stream contained 83 mg/l of hexavalent chrome. A 1000 ml sample was taken and approximately 4.5 grams of material was added to the jar. The pH was adjusted to around 2 and allowed to mix for two hours. Then the solution was checked for hexavalent chrome. The hexavalent chrome level was found to be 24 mg/l. The pH of the solution was raised with sodium hydroxide to a pH of 9. The solution was mixed and 3.5 mg/l of an anionic flocculent was added. The solution was allowed to settle. Analysis of the clear supernate by ICP showed chrome to be 24 mg/l. There was no odor detected in this experiment.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims. Moreover, Applicants hereby disclose all sub-ranges of all ranges disclosed herein. These sub-ranges are also useful in carrying out the present invention.

What is claimed is:

1. A heavy metal sulfide slurry for use in a wastewater treatment process comprising a mixture consisting essentially of a liquid medium and an essentially insoluble salt comprising the reaction product of heavy metal ions and sulfide ions, the essentially insoluble salt having a particle size distribution wherein at least about 50 percent of the particles have a size of less than 1 micron, and the essentially insoluble salt comprising greater than 2 percent by weight of the slurry, wherein upon addition to a wastewater stream containing at least one heavy metal pollutant selected from the group consisting of $Zn^{++}$, $Ni^{++}$, $Sn^{++}$, $Co^{++}$, $Pb^{++}$, $Cd^{++}$, $Ag^+$, $Bi^{++}$, $Cu^{++}$, and $Hg^{++}$, the slurry reacts with and precipitates the heavy metal pollutant.

2. A heavy metal sulfide slurry as set forth in claim 1 wherein the heavy metal ions are selected from the group consisting of $Mn^{++}$ ions, $Fe^{++}$ ions, and $Fe^{+++}$ ions.

3. A heavy metal sulfide slurry as set forth in claim 1 wherein the sulfide ions are derived from a at least one selected from the group consisting of hydrogen sulfide, sodium sulfide, sodium hydrosulfide, potassium sulfide, potassium hydrosulfide, calcium sulfide, and magnesium sulfide.

4. A heavy metal sulfide slurry as set forth in claim 1 wherein the essentially insoluble salt comprises ferrous sulfide.

5. A heavy metal sulfide slurry as set forth in claim 4 wherein the ferrous sulfide salt has a particle size distribution wherein at least about 75 percent of the particles have a size of less than about 1 micron.

6. A heavy metal sulfide slurry as set forth in claim 5 wherein all of the particles have a size of less than about 1 micron.

7. A heavy metal sulfide slurry as set forth in claim 1 wherein the medium comprises water.

8. A heavy metal sulfide slurry for use in a wastewater treatment process made by the method comprising the steps of:
(a) precipitating an essentially insoluble heavy metal sulfide salt from a solution comprising a soluble heavy metal salt and a soluble sulfide, the heavy metal sulfide salt having a particle size distribution wherein at least about 50 percent of the particles have a size of less than 1 micron; and
(b) separating the salt from the solution so as to form a slurry comprising greater than 2% by weight of the salt, wherein upon addition to a wastewater stream containing at least one heavy metal pollutant selected from the group consisting of $Zn^{++}$, $Ni^{++}$, $Sn^{++}$, $Co^{++}$, $Pb^{++}$, $Cd^{++}$, $Ag^{++}$, $Bi^{++}$, $Cu^{++}$, and $Hg^{++}$, the slurry reacts with and precipitates the heavy metal pollutant.

9. A heavy metal sulfide slurry as set forth in claim 8 wherein the step (b) of separating the salt from the solution comprises removing excess solution, thereby forming a slurry comprising greater than 2% by weight of the salt.

10. A heavy metal sulfide slurry as set forth in claim 8 wherein the step (b) of separating the salt from the solution comprises essentially completely separating the salt from the solution and dispersing the salt into a liquid medium, thereby forming a slurry comprising greater than 2% by weight of the salt.

11. A heavy metal sulfide slurry as set forth in claim 8 wherein the step (a) of precipitating an essentially insoluble heavy metal sulfide salt from a solution comprising a soluble heavy metal salt and a soluble sulfide comprises the steps of:
(i) preparing an initial solution comprising a soluble heavy metal salt;
(ii) raising the pH and thereby forming a heavy metal hydroxide; and
(iii) adding a soluble sulfide, thereby forming an essentially insoluble heavy metal sulfide salt comprising the reaction product of the heavy metal hydroxide and the soluble sulfide.

12. A heavy metal sulfide slurry as set forth in claim 8 wherein the step (a) of precipitating an essentially insoluble heavy metal sulfide salt from a solution comprising a soluble heavy metal salt and a soluble sulfide comprises the steps of:
(i) preparing an initial solution comprising a soluble sulfide; and
(ii) adding a soluble heavy metal salt, thereby forming an essentially insoluble heavy metal sulfide salt comprising the reaction product of the soluble heavy metal salt and the soluble sulfide.

13. A heavy metal sulfide slurry as set forth in claim 8 wherein the soluble heavy metal salt is selected from the group consisting of soluble $Mn^{++}$ salts, soluble $Fe^{++}$ salts, and soluble $Fe^{+++}$ salts.

14. A heavy metal sulfide slurry as set forth in claim 8 wherein the soluble sulfide comprises at least one selected from the group consisting of hydrogen sulfide, sodium sulfide, sodium hydrosulfide, potassium sulfide, potassium hydrosulfide, calcium sulfide, and magnesium sulfide.

15. A heavy metal sulfide slurry as set forth in claim 10 further including the step of washing the essentially insoluble heavy metal sulfide salt subsequent to separation from the solution, thereby removing residual soluble salts.

16. A heavy metal sulfide slurry as set forth in claim 8 wherein the essentially insoluble heavy metal sulfide salt has a particle size distribution wherein at least about 75 percent of the particles have a size of less than about 1 micron.

17. A heavy metal sulfide slurry as set forth in claim 16 wherein the essentially insoluble heavy metal sulfide salt has a particle size distribution wherein all of the particles have a size of less than about 1 micron.

* * * * *